United States Patent [19]

Sonnerat et al.

[11] Patent Number: 5,594,334
[45] Date of Patent: Jan. 14, 1997

[54] BEARING HAVING A SENSOR INCORPORATED IN A BEARING SEAL AND A CIRCUMFERENTIAL SENSOR CABLE EXTENDING THROUGH AND ALONG THE SIDE OF THE BEARING SEAL

[75] Inventors: Claude Sonnerat, Annecy le Jieux; Denis Alff; Christian Hajzler, both of Annecy, all of France

[73] Assignee: The Torrington Company, Torrington, Conn.

[21] Appl. No.: 651,198

[22] Filed: May 17, 1996

Related U.S. Application Data

[63] Continuation of Ser. No. 171,133, Dec. 21, 1993.

[30] Foreign Application Priority Data

Jun. 25, 1993 [FR] France ................... 93 07745

[51] Int. Cl.⁶ ................... G01P 3/48; G01B 7/14; F16C 41/04
[52] U.S. Cl. ................... 324/173; 324/207.22; 384/448
[58] Field of Search ................... 324/173, 174, 324/166, 207.2, 207.21, 207.25, 207.22, 235; 384/446, 448, 130

[56] References Cited

U.S. PATENT DOCUMENTS

| | | | |
|---|---|---|---|
| 4,259,637 | 3/1981 | Bloomfield et al. | 324/207.22 |
| 4,946,296 | 8/1990 | Olschewski et al. | 384/448 |
| 4,988,220 | 1/1991 | Christiansen et al. | 324/207.25 |
| 5,011,303 | 4/1991 | Caron | 384/448 |
| 5,026,178 | 1/1991 | Ballhaus | 384/448 |
| 5,143,458 | 9/1992 | Alff et al. | 384/448 |
| 5,145,379 | 9/1992 | Benktander et al. | 384/448 |
| 5,158,374 | 10/1992 | Peilloud et al. | 384/448 |
| 5,293,124 | 3/1994 | Caillaut et al. | 324/207.22 |

FOREIGN PATENT DOCUMENTS

| | | |
|---|---|---|
| 0495323A1 | 7/1992 | European Pat. Off. . |
| 0520853A1 | 12/1992 | European Pat. Off. . |
| 0546918A1 | 6/1993 | European Pat. Off. . |

Primary Examiner—Louis M. Arana
Assistant Examiner—Roger Phillips
Attorney, Agent, or Firm—John C. Bigler

[57] ABSTRACT

A bearing with integrated data sensor has a stationary bearing ring, a rotatable bearing ring, and rolling elements in contact with the bearing rings. An encoder is mounted on the rotatable bearing ring, and a sealing gasket is mounted on the stationary bearing ring. A sleeve for protection of a sensor cable is integrally connected to the sealing gasket and has a groove for housing a sensor means which is connected to the sensor cable. The sleeve has a wall of its extremity which is substantially perpendicular to an external side of the sealing gasket through which the sensor cable exits such that it is tangential to said external side of the sealing gasket.

7 Claims, 3 Drawing Sheets

BEARING HAVING A SENSOR INCORPORATED IN A BEARING SEAL AND A CIRCUMFERENTIAL SENSOR CABLE EXTENDING THROUGH AND ALONG THE SIDE OF THE BEARING SEAL

This application is a continuation of application Ser. No. 08/171,133, filed Dec. 21, 1993.

BACKGROUND OF THE INVENTION

This invention relates generally to a bearing with integrated data sensor and, more particularly, to a bearing with integrated data sensor having provision for a sensor cable.

Such bearing assemblies may include a stationary bearing ring, a rotatable bearing ring, rolling elements in contact with the bearing rings, an encoding means mounted on the rotatable bearing ring, a sealing gasket mounted on the stationary bearing ring, a sensor carried by the sealing gasket, and a sleeve, which is an integral part of the sealing gasket, for the protection of the cable.

Reference EP-A 0,520,853 describes a bearing with integrated data sensor which has an axial outlet for a power supply cable and for transmission of a signal delivered by the sensor. Such an arrangement is axially space-consuming. Accordingly, in applications which involve an adjacent part rotating close to the cable outlet, the packaging of such a bearing or the mounting of the sealing gasket on the fixed ring is difficult or impractical.

Reference FR-A 2,649,457 describes a bearing with integrated data sensor in which the internal bearing ring carries a cable support carried on the external diameter of the internal bearing ring. This arrangement does not permit certain applications of the bearing with integrated data sensor which require the placement of a free bearing support on the periphery and sides of the external bearing ring.

The foregoing illustrates limitations known to exist in present bearings with integrated data sensors. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a bearing with integrated data sensor comprising a stationary bearing ring having an axis, a rotatable bearing ring coaxial with the stationary bearing ring, rolling elements in contact with said bearing rings, and encoding means mounted on the rotatable bearing ring for generating a signal. A sealing gasket, mounted on the stationary bearing ring, carries sensor means for sensing the signal and a sleeve which is integrally connected to the sealing gasket. The sleeve has a groove for housing the sensor means and for protecting a cable connected to the sensor means. The cable exits tangentially with respect to the external side of the sealing gasket, through an extremity wall of the sleeve which is substantially perpendicular to the external side of the sealing gasket.

The foregoing and other aspects will become apparent from the following detailed description of the invention when considered in conjunction with the accompanying drawing figures.

BRIEF DESCRIPTION OF THE DRAWING FIGURES

In the detailed description, identical or equivalent parts of the integrated bearing illustrated in the figures have the same reference numerals.

DETAILED DESCRIPTION

Figure 1:
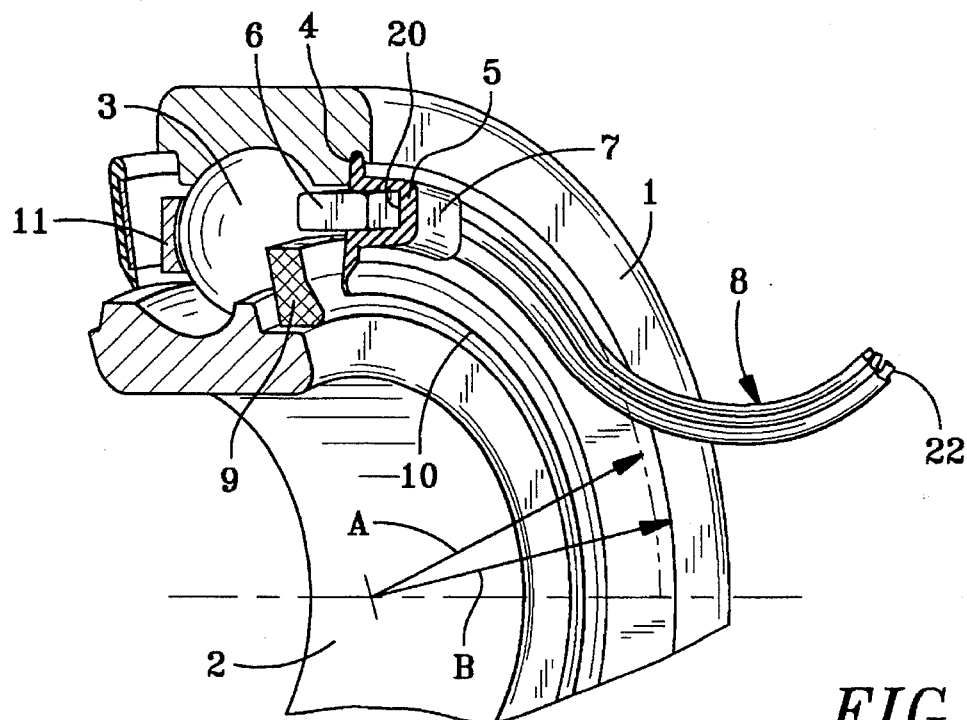
FIG. 1 is a partial perspective view in axial cross-section of a bearing with integrated data sensor illustrating the present invention.
Figure 2:
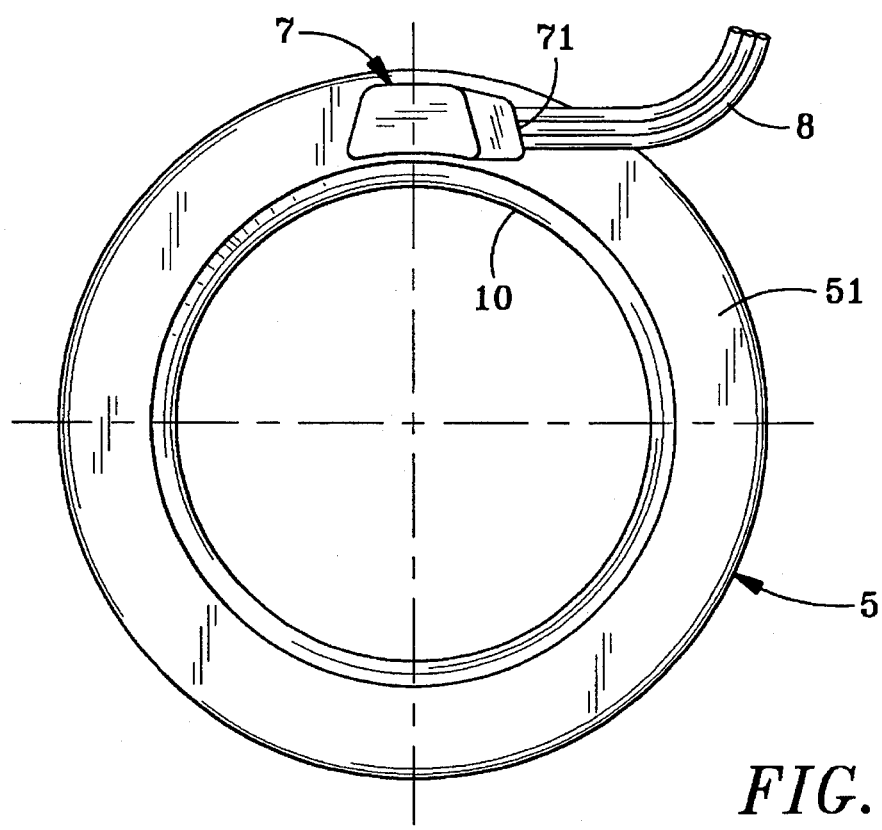
FIG. 2 is a front view of the external side of the sealing gasket according to a first embodiment of the present invention.

Referring now to the drawings, FIG. 1 illustrates the bearing with integrated data sensor of the present invention having a stationary bearing ring 1, a rotatable bearing ring 2, and rolling elements 3 in contact with said bearing rings 1 and 2.

The stationary bearing ring 1 has a groove 4 for housing a sealing gasket 5 on which are mounted a sensor means 6, for example a probe of the Hall-effect type, and a protection sleeve 7 for a sensor cable 8, integrally connected to the sealing gasket 5. The rotatable bearing ring 2 carries an encoding means 9, such as a multipolar magnetic ring. The magnetic ring is in contact with a flexible lip 10 carried by the sealing gasket 5 which ensures a dynamic seal of the bearing.

The bearing rings 1 and 2 have rolling surfaces for the rolling elements 3, which may be arranged in a cage 11 to ensure that the rolling elements 3 are retained and maintained in an angular position. The sleeve 7 has a groove 20 for housing the sensor means 6 connected to the sensor cable 8. The sleeve 7 is both a protection for the sensor cable 8, in particular for its connection with the sensor means 6, and for the sensor means 6 itself.

The radial distance A of the sleeve 7 with respect to the axis of rotation of the bearing, represented in FIG. 1, is:

either less than the internal radius B of the stationary bearing ring 1 for the purpose of facilitating the mounting of the sealing gasket 5 which carries the sensor means 6 on the stationary bearing ring 1 by means of a tool, or approximately equal to the internal radius B of the stationary bearing ring 1 so that external wall 73 of the sleeve 7 which is parallel to the sides of the bearing can serve as a bearing surface for a tool for mounting the sealing gasket 5 on the stationary bearing ring 1.

The sleeve 7 also has a wall 71 of its extremity which is substantially perpendicular to external side 51 of the sealing gasket 5, through which the sensor cable 8 exits so that the latter is tangential to the external side 51 of the sealing gasket 5.

The sensor cable 8 has a rectangular cross-section and consists of conductors 21 distributed along one side of a rectangle defined by said cross-section so that the cable is flat. This arrangement of the conductors 21 corresponds to a minimal space requirement for the bearing; however, a cable with a cross-section of any other shape could also be used. Two opposite sides of the cross-section of the sensor cable 8 are perpendicular to the external side 51 of the sealing gasket 5.

Figure 5:
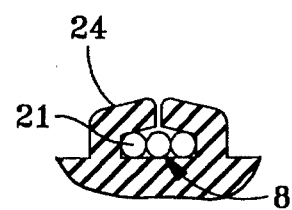
FIG. 5 is a cross-section of detail V of FIG. 4.
Figure 6:
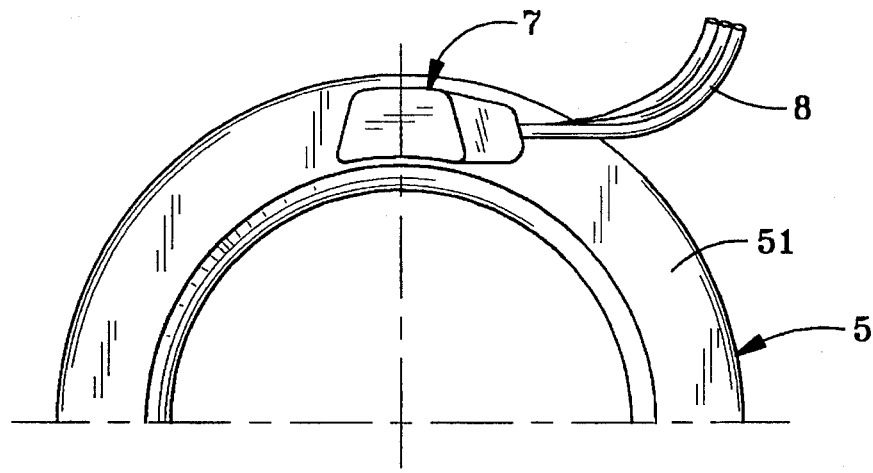
FIG. 6 is a partial front view of the external side of the sealing gasket according to a second embodiment of the present invention.
Figure 8:
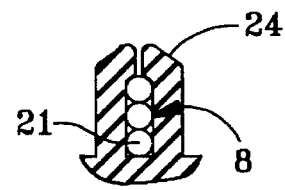
FIG. 8 is a cross-section of detail VIII of FIG. 7.
Figure 7:
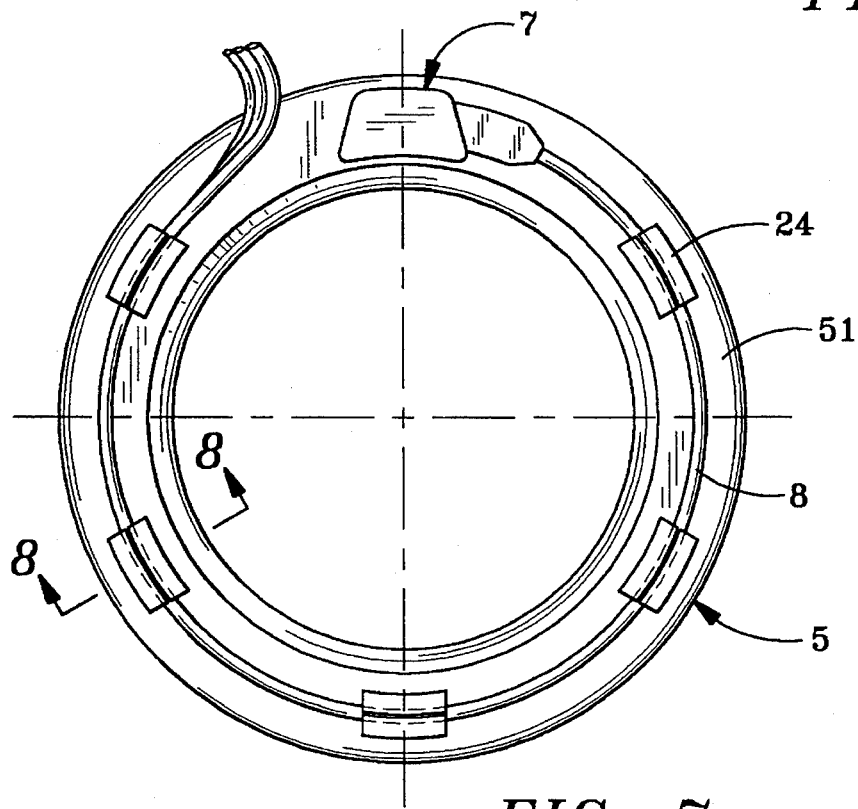
FIG. 7 is a front view of the external side of the sealing gasket according to a variant of the embodiment of FIG. 6.

In the remainder of the description, the term "flat side" 22 will be used to designate the side of the cross-section of the sensor cable 8 with the smallest thickness. The latter side is:

either perpendicular to the external side 51 of the sealing gasket 5 according to a first embodiment of the invention shown in FIGS. 2 through 5, or parallel to the external side 51 of the sealing gasket 5 according to a second embodiment of the invention shown in FIGS. 6 through 8.

As an example, variants corresponding to the first embodiment of the present invention are now described with reference to FIGS. 2 through 5. According to FIG. 2, the wall 71 of the extremity of the sleeve 7 ends at the sensor cable 8 adjacent the connection with the sensor means 6 so that the protection of the sleeve 7 is limited to the sensor means 6 and the connection of the sensor means 6 to the sensor cable 8.

Figure 3:
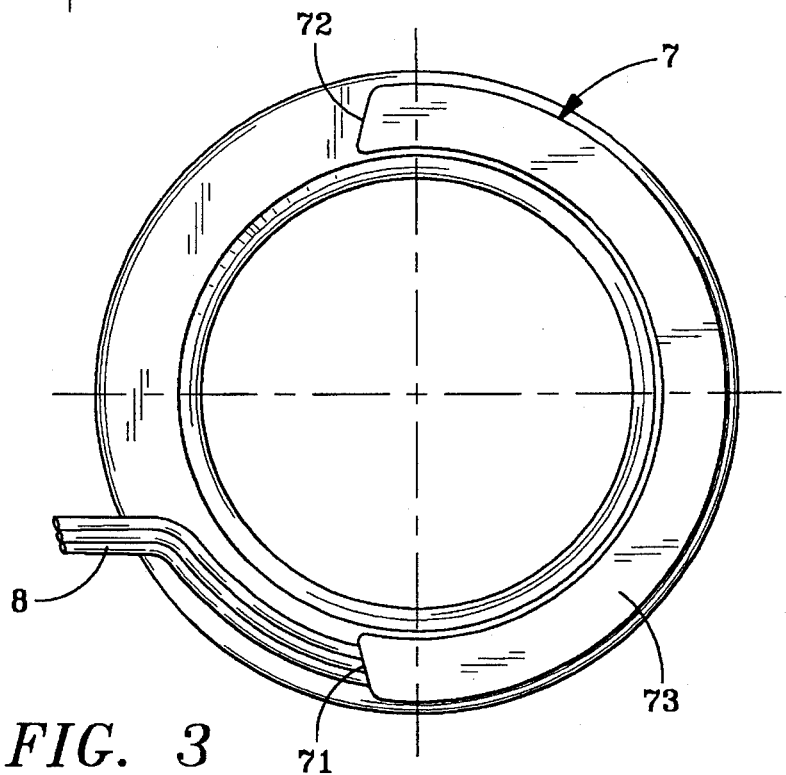
FIG. 3 is a front view of the external side of the sealing gasket according to a first variant of the embodiment of FIG. 2.

According to a variant of the invention shown in FIG. 3, the walls 71 and 72 of the extremities of the sleeve 7 along the external side 51 of the sealing gasket 5 are shifted angularly for the purpose of increasing the resistance of the sensor cable 8 in the sealing gasket 5. In such an embodiment variant, the sleeve 7 can contain an electronic circuit, which is not shown.

Figure 4:
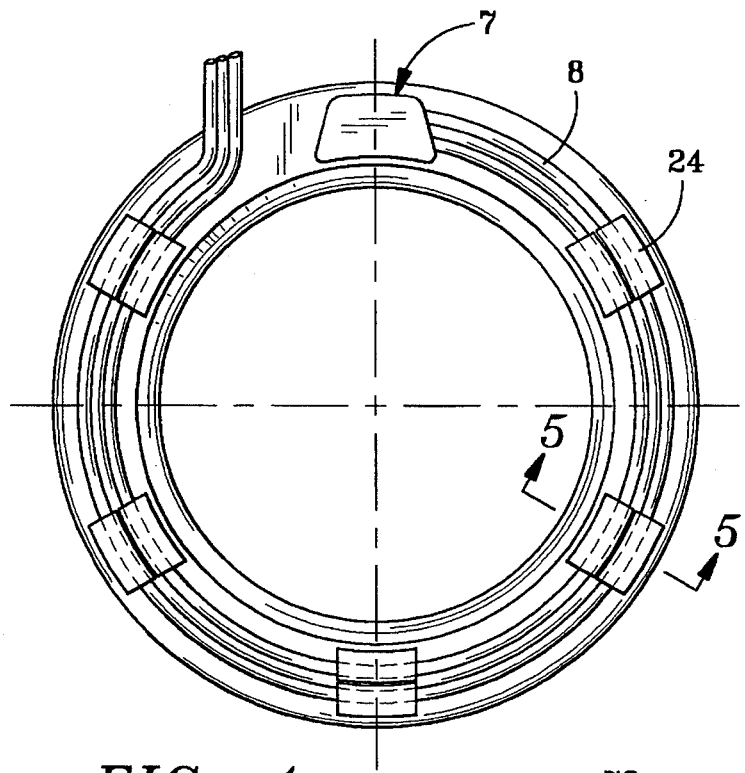
FIG. 4 is a front view of the external side of the sealing gasket according to a second variant of the embodiment of FIG. 2.

According to another embodiment variant of the invention, shown in FIGS. 4 and 5, the sealing gasket 5 carries retention means 24 such as clamps, for retaining the sensor cable 8, which are located at regular intervals on the external side 51 of the sealing gasket 5. Tightening of the clamps 24 allows a temporary maintenance of the cable 8, notably during the assembly of the sealing gasket 5 in the stationary bearing ring 1, or during the packaging or transport of the bearing.

The above description can readily be transposed to the variants corresponding to the second embodiment of the invention, as shown in FIGS. 6 through 8.

The present invention provides an integrated bearing having a sealing gasket with a sensor cable outlet sleeve which requires little space, facilitating adaptation of such bearings to existing assemblies and, also, packaging of such bearings. The sensor cable may extend along the side of the sealing gasket in such a manner that it leaves the side of the external bearing ring accessible for axial immobilization of the bearing or for use of a tool for assembling the entire bearing.

The invention also facilitates the assembly of the sealing gasket which carries the sensor in the external ring of the bearing, leaving a circular facial bearing surface close to the periphery of the sealing gasket. Additionally, the invention allows the positioning of electronic elements in proximity to the sensor element, notably for the purpose of processing the signal of the sensor.

Having described the invention, what is claimed is:

1. An industrial-type bearing with integrated data sensor comprising:

a stationary bearing ring having an axis;

a rotatable bearing ring coaxial with the stationary bearing ring;

rolling elements in contact with said bearing rings;

encoding means mounted on the rotatable bearing ring for generating a signal;

an annular sealing gasket mounted on the stationary bearing ring and having an external side;

sensor means carried by said sealing gasket, extending inward from the sealing gasket, for sensing the signal;

a sensor cable having a portion connected to the sensor means; and a sleeve which is integrally connected to the sealing gasket, the sleeve housing the sensor means and the portion of the sensor cable connected to the sensor means, the sleeve having a first extremity wall which is substantially perpendicular to the external side of the sealing gasket, the sensor cable exiting through the first extremity wall and extends circumferentially along the external side of the sealing gasket.

2. The bearing according to claim 1, wherein the internal radius of the stationary bearing ring is at least as large as the radial distance of the sleeve from said axis of the stationary and rotatable bearing rings.

3. The bearing according to claim 1, wherein the first extremity wall and a second extremity wall of the sleeve, opposite the first extremity wall and along the external side of the sealing gasket, are positioned such that the sleeve extends circumferentially and houses a second portion of the sensor cable.

4. The bearing according to claim 3, wherein the sleeve contains an electronic circuit.

5. The bearing according to claim 1, wherein the sealing gasket carries retention means integrally formed on the external side of the sealing gasket for retaining the sensor cable.

6. The bearing according to claim 1, wherein the cross-section of the sensor cable is rectangular and wherein the sensor cable has conductors distributed along one side of the rectangle defined by said cross-section.

7. The bearing according to claim 6, wherein the sensor cable, as defined by said cross-section, has two opposite sides perpendicular to the external side of the sealing gasket.

* * * * *